United States Patent Office 3,410,868
Patented Nov. 12, 1968

3,410,868
POLYCARBOXYTHIANTHRENE
TETROXIDES
Melvin Harris, Kilchberg, Zurich, Switzerland, assignor,
by mesne assignments, to Eastman Kodak Company,
Rochester, N.Y., a corporation of New Jersey
No Drawing. Filed Aug. 13, 1965, Ser. No. 479,606
14 Claims. (Cl. 260—327)

ABSTRACT OF THE DISCLOSURE

Thianthrene tetracarboxylic acid-5,5,10,10-tetroxides are prepared by the nitric acid oxidation of the corresponding tetralkylthianthrene-5,5,10,10 tetroxides. The thianthrene tetracarboxylic acid-5,5,10,10-tetroxides are esterifiable to the corresponding esters and can be dehydrated to form the corresponding dianhydrides. The compounds are useful either as chemical intermediates in producing valuable chemical compounds such as polymers, adhesives, plasticizers and dyes or per se in applications such as plasticizers or curing agents.

---

This invention relates to a novel class of aromatic polycarboxylic acids, to derivatives thereof, and to the preparation of said polycarboxylic acids. More specifically, the present invention relates to novel polycarboxythianthrene tetroxides, to derivatives thereof and to the preparation of said tetroxide compounds.

Thianthrene tetroxide may be represented by the formula

I.

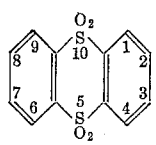

An investigation of the literature shows that only the mono- and dicarboxythianthrene tetroxides have been reported. Thianthrene-2-carboxylic acid 5,5,10,10-tetroxide has been prepared by the oxidation of 2-acetylthianthrene with $CrO_3$ in glacial acetic acid (G. Vasiliu et al., Analele Univ., "C. I. Parhon" Ser. Stiint. Nat. 11 (35), pp. 151–61 (1962); Chemical Abstracts 60, 14499 H (1964)). Similarly, thianthrene-2,7-dicarboxylic acid 5,5,10,10-tetroxide has been prepared by oxidizing 2,7-diacetylthianthrene (J. Pharm. Soc. Japan, 58, pp. 139–41 (1938); Rev. Chim. (Bucharest), 15 (3), pp. 139–42 (1964)). The monomethyl ester of thianthrene-2-carboxylic acid 5,5,10,10-tetroxide has also been reported in the literature (M. Janczewski et al. (M. Curie-Sklodowska Univ., Lublin, Poland), Acad. Polon. Sci., Ser. Sci. Chim. 10, pp. 605–12 (1962); Chemical Abstracts 58, 13941 f (1962)).

The thianthrenetetracarboxylic acid 5,5,10,10-tetroxides have not heretofore been reported. Likewise, the acid dianhydrides and esters of these compounds are not known.

It is an object of this invention to provide a new class of thianthrene derivatives which are useful as plasticizers, curing agents, and intermediates in the preparation of resins and vat dyes.

It is another object of this invention to provide novel thianthrenetetracarboxylic acid 5,5,10,10-tetroxide compounds containing two carboxy groups in each phenyl radical.

A further object of this invention is to provide novel tetraalkyl esters of the thianthrenetetracarboxylic acid 5,5,10,10-tetroxide compounds containing two carboxy groups in each phenyl radical.

Another object of this invention is to provide a dianhydride of a thianthrenetetracarboxylic acid 5,5,10,10-tetroxide containing two carboxy groups in each phenyl ring.

A further object is to provide a process for preparing the new thianthrenetetracarboxylic acid 5,5,10,10-tetroxide compounds of the invention.

Others objects will become apparent hereinafter.

The new thianthrenetetracarboxylic acid 5,5,10,10-tetroxide compounds and the alkyl esters thereof can contain non-oxidizable substituents on one or both of the phenyl rings. Substituents that can be present include, for example, halogen, nitro, a phenyl nucleus, alkoxy, acyloxy and phenoxy. The new thianthrenetetracarboxylic acid 5,5,10,10-tetroxide compounds and the alkyl esters thereof are represented for the most part by the general formula:

II.

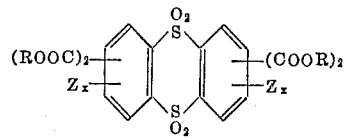

wherein R is selected from the group consisting of hydrogen and alkyl, Z is selected from the group consisting of halogen, nitro, a phenyl nucleus, alkoxy, acyloxy and phenoxy, and x is a number from 0 to 2.

The term alkyl as used herein and in the claims, unless otherwise indicated, refers to a straight or branched chain alkyl hydrocarbon group and is preferably a lower alkyl group having 1 to 6 carbon atoms such as methyl, ethyl, propyl, isopropyl, butyl, isobutyl, amyl, isoamyl, and hexyl, for example.

When Z is an alkoxy group it is preferably a lower alkoxy group having 1 to 6 carbon atoms such as methoxy, ethoxy, propoxy, isopropoxy, butoxy, isobutoxy, amoxy and hexoxy, for example, especially methoxy or ethoxy.

Illustrative of the phenyl nuclei Z can be are phenyl and substituted phenyl nuclei such as o-methylphenyl, m-methylphenyl, p-methylphenyl, o-ethylphenyl, p-ethylphenyl, o-propylphenyl, p-propylphenyl, o-butylphenyl, p-butylphenyl, o-methoxyphenyl, p-methoxyphenyl, o-ethoxyphenyl, p-ethoxyphenyl, p-propoxyphenyl, p-butoxyphenyl, o-chlorophenyl, p-chlorophenyl, o-bromophenyl, p-bromophenyl, o-fluorophenyl, p-fluorophenyl, m-nitrophenyl and p-nitrophenyl, for example.

Illustrative of the acyloxy groups Z can be are acetoxy, propionyloxy, butyryloxy, isobutyryloxy, benzoxy, o-nitrobenzoxy, m-nitrobenzoxy and p-nitrobenzoxy, for example.

The new thianthrenetetracarboxylic acid 5,5,10,10-tetroxide compounds of the invention are prepared by oxidizing the corresponding alkyl-substituted thianthrene tetroxide compounds which are represented for the most part by the general formula:

III.

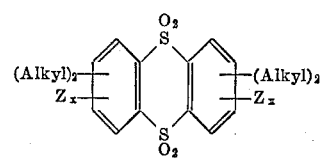

wherein Z and x have the meaning previously assigned to them. The 2 alkyl groups attached to each phenyl ring are oxidizable to carboxy (—COOH) groups. These alkyl groups are preferably lower alkyl groups having 1 to 4 carbon atoms, such as methyl, ethyl, propyl, and butyl although a higher alkyl group such as hexyl, for example, can be used. Ordinarily the alkyl group that is oxidized to carboxy is the methyl group and this alkyl group is preferred.

As illustrated in Formula III, one or both of the phenyl rings of the alkyl-substituted thianthrene tetroxide starting materials, may bear, in addition to the oxidizable alkyl groups, nuclear substituents that are inert to oxidation. The oxidation of the alkyl groups is not deterred by the presence of such substituents and the resulting product will be similarly substituted.

The tetracarboxy acids of this invention can be produced by the oxidation of the alkyl-substituted starting materials with nitric acid at elevated temperatures. Theoretically, in the nitric acid oxidation of alkyl substituents, each alkyl group requires two moles of nitric acid. Using the oxidation of a methyl group as an example, this can be seen by the equation

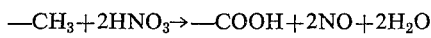

$$-CH_3 + 2HNO_3 \rightarrow -COOH + 2NO + 2H_2O$$

However, an excess of nitric acid is used in order to effectuate as complete a conversion to the acid as possible. An excess of nitric acid is used because the concentration of nitric acid decreases as the oxidation reaction proceeds to completion.

When the nitric acid concentration is too low, the oxidation is incomplete. Generally, nitric acid concentrations lower than 25% by weight in aqueous solution will produce a mixture of products containing primarily the dibasic acids. However, nitric acid concentrations which are too high lead to nitration products and degradation of the thianthrene tetroxide nucleus by cleavage reactions. The danger of nitration and cleavage products is greatly enhanced at concentrations above 35% by weight in aqueous solution. The best results insofar as the preparation of the thianthrenetetracarboxylic acid 5,5,10,10-tetroxide compounds are concerned have been obtained using a 50 to 100% molar excess of nitric acid in concentration from about 25 to about 35% by weight in an aqueous solution.

The reaction temperature of the oxidation depends primarily on the nitric acid concentration. The most satisfactory results have been obtained with operational temperatures within the range of about 150 to about 300° C. and preferably between 180 and 250° C. with the nitric acid concentrations as stated above.

The novel esters of the present invention are prepared by conventional esterification techniques from the corresponding tetracarboxylic acids, such as by refluxing the acids with alkyl alcohols. Lower alkyl alcohols such as methanol, ethanol, propanol, butanol and hexanol are ordinarily employed. As may be evident to one skilled in the art, these techniques are unhindered where one or both phenyl rings of the thianthrene nucleus are substituted with one or more of the non-oxidizable radicals cited above. For example, the esterification product of 4,6 - dichloro - 2,3,7,8 - thianthrenetetracarboxylic acid 5,5,10,10 - tetroxide will be similarly substituted with one chloride radical in each of the four and six positions of the thianthrene nucleus.

Another aspect of this invention by which the foregoing objectives are achieved is the provision of thianthrene tetracarboxylic dianhydride 5,5,10,10 - tetroxides having the general formula:

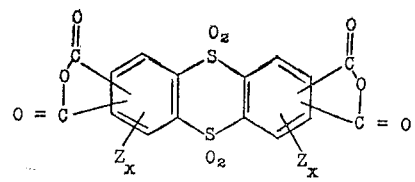

wherein Z and x are as defined hereinbefore and wherein the carboxyl groups on each phenyl ring of the thianthrene nucleus are ortho or adjacent to each other.

The novel dianhydrides of this invention are prepared by conventional techniques from the corresponding tetracarboxylic acids. Such techniques include dehydration of the acid by sublimation under refluxing conditions. As in the case of esterification, these techniques are not disturbed by the presence of non-oxidizable substituents on the phenyl rings of the thianthrene nucleus.

The following examples illustrate the invention.

Example 1

A 25% aqueous solution of nitric acid (125 parts by volume) and 12.5 parts of 2,3,7,8 - tetramethylthianthrene 5,5,10,10 - tetroxide are introduced into a 0.5 liter rotary steel autoclave. The reactor is heated to the range of 200 to 220° C. and kept at this temperature for 4 hours. After cooling and venting, the reaction mixture is removed from the reaction vessel and filtered. The crude 2,3,7,8 - thianthrenetetracarboxylic acid 5,5,10,10 - tetroxide is then washed with cold water and dried. An additional quantity of the tetrabasic acid is obtained by concentrating the mother liquor. (The crude tetrabasic acid may alternatively be recrystallized from water.) A total conversion of the tetramethyl-substituted material to the tetrabasic acid in the range of 75 to 85% is obtained. A sample is prepared for analysis by dissolving the dried crude product in acetone and reprecipitating the acid with chloroform. The structure of the product is confirmed by its infrared and n.m.r. spectra. An elemental analysis yields the following results:

Calculated for $C_{16}H_8O_{12}S_2$: C, 42.11; H, 1.77; S, 14.05. Found: C, 42.07; H, 1.86; S, 13.70.

Example 2

The tetramethyl ester of 2,3,7,8 - thianthrenetetracarboxylic acid 5,5,10,10 - tetroxide is prepared by refluxing for 15 hours a solution of 1 gram of the acid prepared by the process of Example 1 in 30 ml. of absolute methanol. containing 1 ml. of concentrated sulfuric acid. On standing at room temperature, white crystals of the desired tetramethyl ester compound separate from the solution. These white crystals are then purified by crystallization and then recrystallization from methanol. The crystals melt in the temperature range from 268 to 270° C. An elemental analysis shows the following results:

Calculated for $C_{20}H_{16}O_{12}S_2$: C, 46.87; H, 3.14; S, 12.53. Found: C, 47.16; H, 3.05; S, 12.53.

Example 3

A mixture containing 15 parts of acetic anhydride and 1 part of 2,3,7,8 - thianthrenetetracarboxylic acid 5,5,10, 10 - tetroxide is refluxed for 30 minutes. On cooling, the dianhydride crystallizes out. The infrared spectrum of the collected crystals confirms the presence of anhydride linkages. Elemental analysis gives the following results:

Calculated for $C_{16}H_4O_{10}S_2$: C, 45.72; H, 0.96; S, 15.26. Found: C, 45.76; H, 1.02; S, 15.14.

Example 4

1,2,7,8-thianthrenetetracarboxylic acid 5,5,10,10-tetroxide is prepared from the corresponding tetramethyl-substituted thianthrene tetroxide according to the general procedure outlined in Example 1. Tetra-carboxylic substitution of the thianthrene nucleus in the 1,2,7 and 8 positions is confirmed by infrared and n.m.r. spectra. Elemental analysis results are similar to those of Example 1.

Example 5

The tetramethyl ester of 1,2,7,8-thianthrenetetracarboxylic acid 5,5,10,10-tetroxide is prepared according to the same process outlined in Example 2. The melting point of the tetramethyl 1,2,7,8-thianthrenetetracarboxylate 5,5,10,10-tetroxide is observed to be in the range from 262 to 264° C. Elemental analysis yields the following:

Calculated for $C_{20}H_{16}O_{12}S_2$: C, 46.87; H, 3.14; S, 12.53. Found: C, 46.67; H, 2.91; S, 12.33.

Example 6

1,2,7,8-thianthrenetetracarboxylic acid 5,5,10,10-tetroxide produced according to the process of Example 4 is sublimed at a temperature of 290 to 310° C. and a pressure of 0.05 mm. of mercury. White crystals of the corresponding dianhydride are obtained. Examination of the infrared spectrum of the dianhydride confirms the presence of the anhydride linkages. An elemental analysis shows the following:

Calculated for $C_{16}H_4O_{10}S_2$: C, 45.72; H, 0.96; S, 15.26. Found: C, 45.58; H, 0.93; S, 15.33.

Example 7

By the process described in Example 1, 1,4,6,9-thianthrenetetracarboxylic acid 5,5,10,10-tetroxide is prepared from the corresponding tetramethyl-substituted thianthrene tetroxide. A 70% conversion to the tetrabasic acid is obtained. A sample is prepared for analysis by recrystallization from water. The analysis gave the following results:

Calculated for $C_{16}H_8O_{12}S_2$: C, 42.11; H, 1.77; S, 14.05. Found: C, 41.78; H, 1.67; S, 14.2.

Example 8

The tetramethyl ester of 1,4,6,9-thianthrenetetracarboxylic acid 5,5,10,10-tetroxide is prepared in accordance with the procedure described in Example 2. The crystals recovered after two crystallizations from methanol melt at a temperature of 294° C. Elemental analysis results are as follows:

Calculated for $C_{20}H_{16}O_{12}S_2$: C, 46.87; H, 3.14; S, 12.53. Found: C, 46.67; H, 3.14; S, 12.58.

Example 9.—Preparation of 1,2,7,8- and 2,3,7,8-tetramethylthianthrene-5,5,10,10-tetroxides Sulfur monochloride (323 g.) was added dropwise with stirring to 900 ml. of o-xylene containing 270 g. of aluminum chloride. The temperature was maintained at 20–30° C. After complete addition of the sulfur monochloride, which required about 5 hours, the reaction mixture was held at 60° C. for 1.5 hours. After being cooled, the reaction mixture was poured onto crushed ice to decompose the aluminum chloride and the organic layer which formed was separated. Removal of the excess o-xylene by steam distillation left a brown viscous liquid which was taken up in 1.1 liters of hot benzene. On cooling, 83 g. of a crystalline product was obtained. Recrystallization from ethyl alcohol gave 2,3,7,8-tetramethylthianthrene a white crystalline product melting at 179–180° C. The structure was confirmed by IR and NMR spectra and elemental analysis. The mother liquor was concentrated to 250 ml. and left standing at room temperature for several days; 180 g. of a slightly brown crystalline product was obtained. Further concentration of the mother liquor yielded an additional 10 g. of crystalline product. Spectra of the product indicated it was a mixture of 1,2,7,8- and 2,3,7,8-tetramethylthianthrenes in a ratio of about 70:30. Distillation of the mixture at a pressure of 0.05 mm. yielded 1,2,7,8-tetramethylthianthrene, B.P. 187–190° C./0.05 mm., M.P. 125–127° C.; the residue was 2,3,7,8-tetramethylthianthrene. The total yield was about 80%, based on sulfur monochloride.

The oxidation of the 1,2,7,8- and 2,3,7,8-tetramethylthianthrenes to the corresponding 5,5,10,10-tetroxide compounds was carried out in the usual manner with excess hydrogen peroxide in glacial acetic acid. 1,2,7,8-tetramethylthianthrene-5,5,10,10-tetroxide decomposes at 330–340° C. and 2,3,7,8-tetramethylthianthrene-5,5,10,10-tetroxide at 350° C.

Example 10.—Preparation of 1,3,7,9-tetramethylthianthrene and an isomeric mixture of 1,3,7,9- and 1,3,6,8-tetramethylthianthrenes Sulfur monochloride (94.4 g.) was added dropwise with stirring to m-xylene (265 g.) containing 97.4 g. of aluminum chloride. The temperature was kept at 20° C. After complete addition of the sulfur monochloride the reaction mixture was heated to 50–60° C. and maintained at this temperature for 2 hours. After cooling, the reaction mixture was poured onto crushed ice to decompose the aluminum chloride. The organic layer was collected and excess m-xylene was removed therefrom by steam distillation. The residue, a brown oil was taken up in benzene and the solution was washed successively with ammonium sulfide, 2 N NaOH, and water, and then dried. Evaporation of the solvent gave a yellow oil which on distillation at 1 mm. yielded two fractions, boiling at 150–180° C./1 mm. and 190° C./1 mm. IR and NMR data and elemental analysis showed that the higher boiling fraction was 1,3,7,9-tetramethylthianthrene and the other fraction was a mixture of 1,3,7,9- and 1,3,6,8-tetramethylthianthrenes.

Both fractions were oxidized to the corresponding 5,5,10,10-tetroxides with hydrogen peroxide in glacial acetic acid. The 1,3,7,9-tetramethylthianthrene-5,5,10,10-tetroxide obtained melts at 287–290° C. and the isomeric mixture of 1,3,7,9- and 1,3,6,8-tetramethylthianthrene-5,5,10,10-tetroxides obtained melts at 210–250° C.

Example 11.—Preparation of 1,3,7,9-thianthrenetetracarboxylic acid 5,5,10,10-tetroxide 1,3,7,9-tetramethylthianthrene-5,5,10,10-tetroxide (10 g.) and 150 parts by volume of a 25% aqueous solution of nitric acid were introduced into an 0.5 liter rotary steel autoclave, heated to 200° C. (952 p.s.i.), and kept at this temperature for 10 minutes. After cooling and venting, the reaction mixture was removed from the reaction vessel and the white crystals of the desired product which formed were collected. The 1,3,7,9-thianthrenetetracarboxylic acid 5,5,10,10-tetroxide thus obtained after crystallization from water, gave the following elemental analysis:

Calculated for $C_{16}H_8O_{12}S_2$: C, 42.11; H, 1.77; S, 14.05. Found: C, 41.94; H, 1.42; S, 14.27.

Example 12

An isomeric mixture of 1,3,7,9- and 1,3,6,8-thianthrenetetracarboxylic acid 5,5,10,10-tetroxide was obtained by the oxidation of the isomeric mixture of 1,3,7,9- and 1,3,6,8-tetramethylthianthrene - 5,5,10,10 - tetroxides obtained in Example 10 using the procedure described in Example 11.

When the tetramethylthianthrene tetroxide starting materials are substituted with one or more nonoxidizable substituents, the corresponding thianthrenetetracarboxylic acids are produced as, for example, by the same process described in Example 1. For example, when 4,6-dichloro-1,2,7,8,-tetramethylthianthrene 5,5,10,10-tetroxide is reacted with a 25% by weight solution of nitric acid at elevated temperature, 4,6-dichloro-1,2,7,8,-thianthrenetetracarboxylic acid 5,5,10,10-tetroxide is produced. Among the compounds which may be prepared in like manner are, for example, 4,6-dibromo-2,3,7,8-thianthrenetetracarboxylic acid 5,5,10,10-tetroxide;

2,7-diethoxy-1,3,6,8-thianthrenetetracarboxylic acid 5,5,10,10-tetroxide;

4,6-dimethoxy-2,3,7,8-thianthrenetetracarboxylic acid 5,5,10,10-tetroxide;

1,4-dibromo-2,3,7,8-thianthrenetetracarboxylic acid 5,5,10,10-tetroxide;

4,6-dichloro-2,3,7,8-thianthrenetetracarboxylic acid 5,5,10,10-tetroxide;

4,6-dinitro-2,3,7,8-thianthrenetetracarboxylic acid 5,5,10,10-tetroxide;

4,6-dimethoxy-1,2,7,8-thianthrenetetracarboxylic acid 5,5,10,10-tetroxide;
4,6-dinitro-1,2,7,8-thianthrenetetracarboxylic acid 5,5,10,10-tetroxide;
4,6-dichloro-1,2,7,8-thianthrenetetracarboxylic acid, 5,5,10,10-tetroxide;
4,6-dibromo-1,2,7,8-thianthrenetetracarboxylic acid 5,5,10,10-tetroxide;
4,6-dinitro-1,3,7,9-thianthrenetetracarboxylic acid 5,5,10,10-tetroxide;
4,6-dibromo-1,3,7,9-thianthrenetetracarboxylic acid 5,5,10,10-tetroxide;
4,6,-dichloro-1,3,7,9-thianthrenetetracarboxylic acid 5,5,10,10-tetroxide;
4,6-dimethoxy-1,3,7,9-thianthrenetetracarboxylic acid 5,5,10,10-tetroxide;
4,6-diphenyl-2,3,7,8-thianthrenetetracarboxylic acid 5,5,10,10-tetroxide; and
2,8-diacetyloxy-1,3,7,9-thianthrenetetracarboxylic acid 5,5,10,10-tetroxide.

The corresponding esters of the above acids can also be prepared by conventional esterification techniques as illustrated, for example, in Example 2. For example, 4,6-dibromo-2,3,7,8-thianthrenetetracarboxylic acid 5,5,10,10-tetroxide can be esterified with ethanol to produce tetraethyl 4,6-dibromo-2,3,7,8-thianthrenetetracarboxylate 5,5,10,10-tetroxide.

Other esters which can be prepared in accordance with the practice of this invention include, for example,
tetramethyl 1,3,7,9-thianthrenetetracarboxylate 5,5,10,10-tetroxide;
tetraethyl 1,3,7,9-thianthrenetetracarboxylate 5,5,10,10-tetroxide;
tetrabutyl 1,3,7,9-thianthrenetetracarboxylate 5,5,10,10-tetroxide;
tetraethyl 1,2,7,8-thianthrenetetracarboxylate 5,5,10,10-tetroxide;
tetrapropyl-1,2,7,8-thianthrenetetracarboxylate 5,5,10,10-tetroxide;
tetraisopropyl 1,2,7,8-thianthrenetetracarboxylate 5,5,10,10-tetroxide;
tetrabutyl 1,2,7,8-thianthrenetetracarboxylate 5,5,10,10-tetroxide;
tetrahexyl 1,2,7,8-thianthrenetetracarboxylate, 5,5,10,10-tetroxide;
tetraethyl 2,3,7,8-thianthrenetetracarboxylate;
tetrapropyl 2,3,7,8-thianthrenetetracarboxylic acid 5,5,10,10-tetroxide;
tetrabutyl 2,3,7,8-thianthrenetetracarboxylate 5,5,10,10-tetroxide;
tetrahexyl-2,3,7,8-thianthrenetetracarboxylate 5,5,10,10-tetroxide;
tetraethyl-1,4,6,9-thianthrenetetracarboxylate 5,5,10,10-tetroxide;
tetrapropyl-1,4,6,9-thianthrenetetracarboxylate 5,5,10,10-tetroxide;
tetrabutyl 1,4,6,9-thianthrenetetracarboxylate 5,5,10,10-tetroxide;
tetramethyl 1,3,6,8-thianthrenetetracarboxylate 5,5,10,10-tetroxide;
tetraethyl 1,3,6,8-thianthrenetetracarboxylate 5,5,10,10-tetroxide and tetrabutyl 1,3,6,8-thianthrenetetracarboxylate 5,5,10,10-tetroxide.

The corresponding dianhydrides of any of the above tetracarboxylic acids having two carboxylic acid groups on each phenyl ring attached to adjacent nuclear carbon atoms can be prepared by the processes of Examples 3 or 6. Thus, when 4,6-dibromo-2,3,7,8-thianthrenetetracarboxylic acid 5,5,10,10-tetroxide is reacted with acetic anhydride as described in Example 3, there is obtained 4,6-dibromo - 2,3,7,8-thianthrenetetracarboxylic dianhydride 5,5,10,10-tetroxide.

Other dianhydrides which may be prepared in accordance with the practice of this invention include, for example, 1,2,6,7-thianthrenetetracarboxylic dianhydride 5,5,10,10 tetroxide;
3,4,6,7-thianthrenetetracarboxylic dianhydride 5,5,10,10-tetroxide;
4,6-dichloro-1,2,7,8 - thianthrenetetracarboxylic dianhydride 5,5,10,10-tetroxide;
4,6-diphenyl-2,3,7,8 - thianthrenetetracarboxylic dianhydride 5,5,10,10-tetroxide;
4,6-dinitro-1,2,7,8 - thianthrenetetracarboxylic dianhydride 5,5,10,10-tetroxide;
4.6-dimethoxy-2,3,7,8 - thianthrenetetracarboxylic dianhydride 5,5,10,10-tetroxide;
4,6-diacetyloxy-2,3,7,8 - thianthrenetetracarboxylic dianhydride 5,5,10,10-tetroxide; and
4,8-diphenoxy-2,3,6,7 - thianthrenetetracarboxylic dianhydride 5,5,10,10-tetroxide.

The novel thianthrenetetracarboxylic acid tetroxides of this invention are useful as intermediates in the preparation of a variety of organic compounds including linear and branched-chain polymers, adhesives, plasticizers and dyes. For example, the acids or dianhydrides can be reacted with benzene in the presence of aluminum chloride to give dibenzoyl derivatives. These intermediates upon ring closure under the influence of condensing agents yield dianthraquinone derivatives such as, for example,

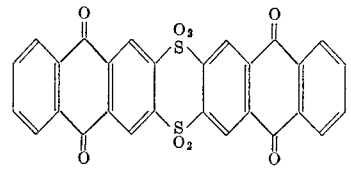

The thianthrenetetracarboxylic acid 5,5,10,10-tetroxides can be used to prepare polyesters or polyamides according to conventional techniques. Thus, they can be reacted with polyhydric compounds such as ethylene glycol, propylene glycol, glycerine, etc., to prepare polyesters which can be used to prepare molded objects. The acids of this invention can also be used to replace a portion of the polycarboxylic acid component in the preparation of conventional polyesters to modify the properties of the resultant products.

In addition, the novel esters of this invention are useful as plasticizers for thermoplastic resins, such as polyvinyl chloride, polyvinylidene chloride, polystyrene, polyethylene, polypropylene, etc. Furthermore, the dianhydrides are useful as curing agents for epoxy resins.

Although the invention has been described in considerable detail with particular reference to certain preferred embodiments thereof, variations and modifications can be effected within the spirit and scope of the invention as described hereinbefore, and as defined in the appended claims.

I claim:
1. A thianthrene 5,5,10,10-tetroxide compound selected from the group consisting of a thianthrenetetracarboxylic acid 5,5,10,10 - tetroxide containing two carboxy groups in each phenyl ring and the tetraalkyl esters of said thianthrenetetracarboxylic 5,5,10,10 - tetroxide compounds, wherein said alkyl is a straight or branched-chain radical containing from 1 to 6 carbon atoms.
2. A thianthrene 5,5,10,10 - tetroxide having the formula:

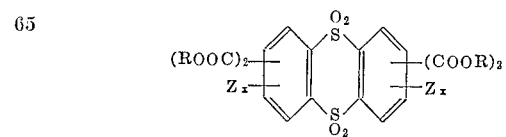

wherein R is selected from the group consisting of hydrogen and straight or branched chain alkyl of 1 to 6 carbon atoms; Z is selected from the group consisting of halogen, nitro, alkoxy having from 1 to 6 carbon atoms, phenyl, phenoxy, alkoxyphenyl wherein said alkoxy contains from 1 to 4 carbon atoms, alkanoyloxy of 2 to 4 carbon atoms, benzoxy and nitrobenzoxy; and $x$ is a number from 0 to 2.

3. An intercyclic dianhydride of a thianthrenetetracarboxylic acid 5,5,10,10-tetroxide having the formula

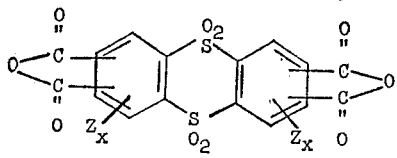

wherein Z is selected from the group consisting of halogen, nitro, alkoxy having from 1 to 6 carbon atoms, phenyl, phenoxy, alkoxyphenyl wherein said alkoxy contains from 1 to 4 carbon atoms, alkanoyloxy of 2 to 4 carbon atoms, benzoxy and nitrobenzoxy; wherein $x$ is a number from 0 to 2; and wherein the carbonyl groups on each phenyl ring are ortho to each other.

4. 2,3,7,8 - thianthrenetetracarboxylic acid 5,5,10,10-tetroxide.

5. The tetramethyl ester of 2,3,7,8 - thianthrenetetracarboxylic acid 5,5,10,10-tetroxide.

6. 1,2,7,8 - thianthrenetetracarboxylic acid 5,5,10,10-tetroxide.

7. The tetramethyl ester of 1,2,7,8-thianthrenetetracarboxylic acid 5,5,10,10-tetroxide.

8. 1,4,6,9 - thianthrenetetracarboxylic acid 5,5,10,10-tetroxide.

9. The tetramethyl ester of 1,4,6,9-thianthrenetetracarboxylic acid 5,5,10,10-tetroxide.

10. 1,3,7,9 - thianthrenetetracarboxylic acid 5,5,10,10-tetroxide.

11. The tetramethyl ester of 1,3,7,9-thianthrenetetracarboxylic acid 5,5,10,10-tetroxide.

12. An intercyclic dianhydride of a thianthrenetetracarboxylic acid 5,5,10,10-tetroxide containing two adjacent carboxy groups in each phenyl ring.

13. The intercyclic dianhydride of 1,2,7,8-thianthrenetetracarboxylic acid 5,5,10,10-tetroxide.

14. The intercyclic dianhydride of 2,3,7,8-thianthrenetetracarboxylic acid 5,5,10,10-tetroxide.

References Cited

UNITED STATES PATENTS 2,338,516  1/1944  Kern et al. _____ 260—327

OTHER REFERENCES

Fieser et al.: Advanced Organic Chemistry, Reinhold Pub. Corp., New York (1961), page 806.

JAMES A. PATTEN, *Primary Examiner.*